MULTI-FREQUENCY CODE SIGNALLING ARRANGEMENT

Filed Sept. 10, 1963 2 Sheets-Sheet 1

INVENTORS
T. BURIAN
H. PLITSCHKA
G. VOGEL

MULTI-FREQUENCY CODE SIGNALLING ARRANGEMENT

Filed Sept. 10, 1963 2 Sheets-Sheet 2

INVENTOR
T. BURIAN
H. PLITSCHKA
G. VOGEL

BY

ATTORNEY 3,313,887
MULTI-FREQUENCY CODE SIGNALLING ARRANGEMENT

Theodor Burian, Ditzingen, Heinz Plitschka, Stuttgart-Zuffenhausen, Rotweg, and Georg Vogel, Schwieberdingen uber Ludwigsburg, Germany, assignors to International Standard Electric Corporation, New York, N.Y., a corporation of Delaware Filed Sept. 10, 1963, Ser. No. 307,848
Claims priority, application Germany, Sept. 14, 1962, St 19,715
6 Claims. (Cl. 179—18)

Figure 1:
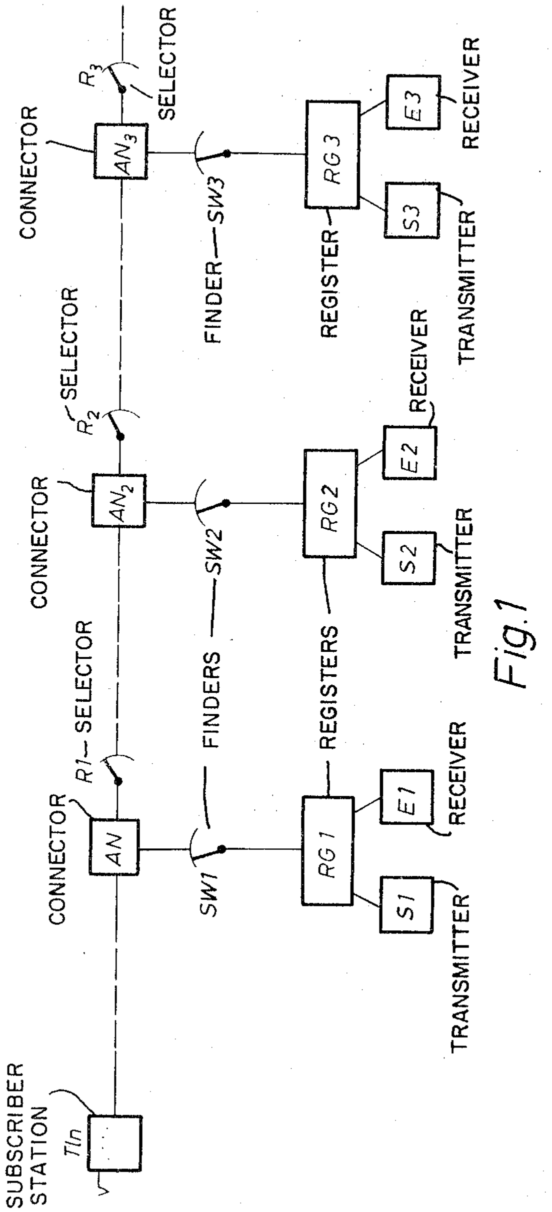

The invention relates to a compelled-system signalling method with multi-frequency-code-signals for telecommunication, particularly telephone systems.

Such signalling methods are preferably used to transfer or transmit informations through long distance lines necessary for the establishment of connection. The signal is forwarded from a transmitter or sender station. A signal is emitted and the sending station receives a counter or backward signal from the receiving station as soon as the emitted signal has been correctly received and evaluated. By reception and evaluation of this backward signal the emission of the signal is completed in the sender station. As soon as no signal arrives any more in the receiving station the backward signal is switched-off. Finishing of the backward signal means at the transmitter station readiness to emit a new signal. This so-called compelled-system signalling method possesses the big advantage that for the entire signalling periods no predetermined time advances are necessary. Since all processes occur in a timely succession the duration of the signal is automatically adapted to the transmission characteristics of the sender, the transmission line and the receiver. The German printed application 1,123,711 describes such a signalling method in which the compelled system of signalling is genuinely maintained and comprises proper storing and evaluation on the receiving end. This kind of signalling, however, shows the considerable disadvantage that the signalling velocity is heavily reduced. This fact is particularly impairing during large delay times on the transmission line and during the transmission of several code signals.

The object of the invention is to provide a compelled-system signalling system using multi-frequency code signals for telecommunication, particularly telephone systems which maintain the advantages of the compelled-system and moreover permit an essential increase of the signalling velocity. The system according to the invention is characterised in this that immediately after identification of a signal received the switching process of the counter direction necessary for the signalling cycle is initiated, the switching condition of the receiving end maintained and the receiving device is blocked against new signals, that in the maintained state of the receiving device storing and evaluation of the received signal is performed and that thereupon the holding circuit is released and switching-off of the confirmation signal will depend on the end of the signal received. Due to this method the confirmation signal and the evaluation of the code signal is performed in parallel. In this parallel time history of two switching processes it should be considered which station commences with the signalling. If the sender commences we have a so-called sending method. The sender offers the receiving station the first signal. The confirmation signal emitted by the receiving station can be considered as an acknowledgment signal. On the transmitting end the acknowledgment signal is evaluated as a signal received and the emitted code signals have the character of the confirmation signal. The switching process necessary for the opposite direction is on the receiving end emission of the confirmation signal and on the transmitting end switching-off of the signal emitted. The conditions mentioned above are just reversed in the so-called interrogating method in which the receiving end commences with signalling.

A feedback or intercepting circuit in the receiver assures that the signal cycle is not erroneously advanced by short-time signal interruptions. The switching-off of the confirmation signal depends on the end of the code signal received, so that the compelled system maintains signal and counter signal on the transmission line. For safety reasons the invention provides a code checking device operated responsive to the received signal for initiating the confirmation signal. According to the invention the intercepting circuit is switched-on together with the code checking device. The intercepting circuit, which could be a bistable type circuit, maintains the receiving end switched on until the signal is evaluated and stored, independently of the signal on the transmission line. The intercepting circuit, however, may also be switched-on after a certain delay time after any arbitrary receiver of the receiving end has responded. This protection time may be necessary to prevent the varying responding times of the receivers from causing a trouble alarm. If a code signal has been stored the inventive device advances to the succeeding empty storing cell of the storage. The receiving device is also blocked to prevent the reception of another signal during the evaluation and storing period. The blocking is achieved independently of the condition of the intercepting circuit. The compelled system again becomes effective after completing the storage of the preceding signal and another storage unit at the receiving end is ready for reception.

In a further embodiment of the signalling method according to the invention the confirmation signal will be changed according to a firmly predetermined program. It is thereby possible for example to emit the informations stored in the storage of the transmitter station in the so-called transmitting method in a certain sequence adapted to the system. According to the invention a protective time is inserted after the responding of the code checking device before storing evaluation, in order to discriminate a genuine signal from a short-time interference.

Figure 2:
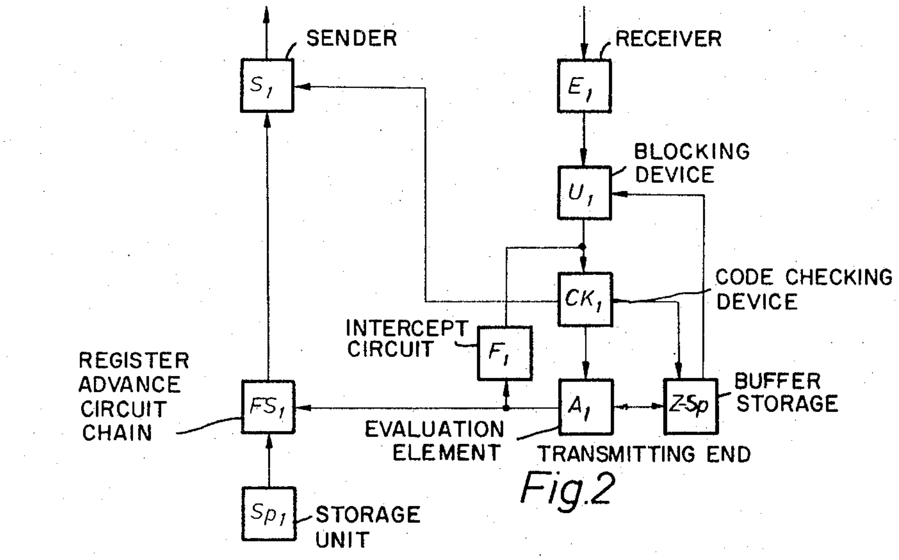
Figure 3:
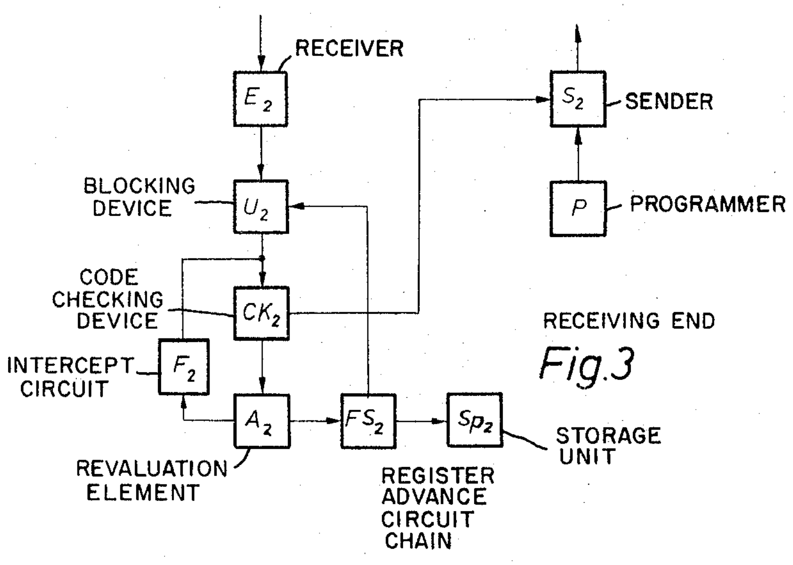

The invention will more closely be explained with the aid of the accompanying drawings, in which:

FIG. 1 represents the devices necessary for a compelled-system signalling method, FIG. 2 shows the principal circuit diagram of a transmitter station for the signalling method according to the invention, and FIG. 3 shows the receiving end for such a signalling method.

FIG. 1 shows in a principal circuit diagram the establishment of a connection in a telephone system. The dial information emitted from the subscriber station is stored in the originating exchange of the subscriber T1$n$ in a register RG1 connected to the line via a connector such as connecting element AN1 and a call finder SW1. To transmit this information or only parts of this information into the succeeding exchanges the compelled-system signalling method mentioned in the preamble is used. After having selected an outgoing call line through a selector such as selecting element R1, the registers RG1 and RG2 are connected mutually to exchange the information. Now two different transmission methods can be used, the sending method in which the transmitting end (RG1) commences with the signalling and the so-called interrogating method in which the receiving end (RG2) commences the signalling. If the further path of the connection to be established is determined by evaluating a portion of the information, through-connection to register RG3 in the succeeding exchange is performed through the selecting element R2. Each register is equipped with V.-F. transmitters S1, S2, S3 to emit the signals and the V.-F. receivers E1, E2, E3 to receive the signals. Considering the sending method the first information will be emitted from the register RG1 via the sender S1. This signal will be received through the receiver E2 and acknowledge through the sender S2. Receipt of this acknowledgement signal through the receiver E1 will be used to terminate the signal emitted from the sender S1. As soon as the receiver E2 receives the end of the signal, the acknowledgement or confirmation signal of the sender S2 is switched-off. Having received the end of the acknowledgement signal through the receiver E1, the emission of a new code signal is prepared. This process is repeated until it has been determined on the register RG2 what further path shall be taken to establish the connection. The same transmission method applies between register RG1 and RG3. The transmission method, however, can also be selected in such a way that the receiving end commences with the signalling. Always then, when the receiving end is ready to accept a code signal a requesting signal will be transmitted via the sender, e.g. S3, to the register RG1, that is to the receiving device E1. Thereby release of the transmitting via S1 is initiated. This interrogating method is of advantage, where the receiving station must interrogate arbitrary information which are probably required in the sequence of a predetermined program. Therefore different meanings may be applied to the requesting signals.

The accomplishment of the signalling according to the invention will be explained with the aid of FIGS. 2 and 3. A sending method is selected as transmission method. However, the invention is not limited, if, as explained in the preamble of the specification, the switching processes are initiated for the opposite direction to obtain the interrogating method. The code signal emitted via a transmitting device S1 which may be any well known sender circuit, reaches the receiver E2 through the toll line. The receiver may be any well known voice frequency type receiver comprising the proper pass filters. Supervision to the correct code signal is performed by the code checking device CK2 which may comprise any well known timing arrangement to assure that the received signal is of the proper duration. If a genuine code signal arrives the first acknowledgement signal is emitted, according to the invention, via the sending device S2. A programming device P may be used to control the sender S2 in conjunction with the checking device CK2. The programming device P may be any well known programmer. Thus, in the inventive arrangement the simultaneous receipt of signals from the checking device CK2 and the programming device P may be required to operate sender S2. The evaluating and storing process in the register RG2 occurs in parallel with the transmission process on the line. The code signal arriving at the output of the code checking device CK2 is maintained, by a separate intercepting circuit F2 which may be any proper feedback circuit. The influence of the receiving devices E2 on the evaluation elements CK2, A2, and FS2, is prevented via the evaluation device A2 which may be any code receiver, such as a two out of five receiver and the register-advancing circuit chain FS2, if, after storing the received code signal and after completed receiving signal, the advancing chain circuit FS2 selects an empty storage or register cell. The intercepting circuit F2 is released and only then the receiver is ready to accept another code signal. By this means the compelled-system is restored on the transmission line and over the evaluation circuit. Even if the signalling cycle is quicker on the transmission line than the evaluation in storing of the code signal both processes running in parallel cannot interfere with each other, because the compelled-system is protected by the blocking device U2 at the receiving end. Similar conditions previal at the sender or transmitting station. The confirmation signal emitted from the transmitting end S2 is received by the receiving device E1. After indentification of a genuine code signal via the code checking device CK1 the transmission of the signal via the sender S1 is interrupted. Evaluation of the confirmation signal via the evaluation device A1 and the buffer storage Z–*Sp* is achieved in parallel to this process. The emission of the following signal is prepared via the register-control-switch FS1. The received confirmation signal is intercepted through the intercepting circuit E1 and the evaluation and storing process is protected by the blocking device U1. If the evaluating and storing process is completed before the confirmation signal is finished the confirmation signal remains via the code checking circuit CK1 and directly controls the transmitting device S1. If the evaluating and storing process needs more time the blocking device H1 prevents any influence of the newly arriving signal onto the evaluation elements CK1, A1, Z–*Sp*. It is secured in any case that on the transmitting end as well as on the receiving end the compelled-system is re-established between the transmission line and the evaluation means after the signal. Due to the parallel course of the processes on the transmitting and on the receiving end a considerable increase of the signalling velocity is obtained, maintaining the advantages of a compelled-system method.

What is claimed is:

1. A compelled system signalling arrangement using multi-frequency coded signals between sending registers and receiving registers in telephone systems, transmitting means associated with said sending registers for transmitting coded signals to said receiving registers, receiver means at said receiving register for receiving said coded signals, code checking means operated responsive to said coded signals originally received by said receiving register receiving means, associated sender means controlled by the operation of said code checking means to transmit a confirmation signal, receiving means at said sending register for receiving said confirmation signal, blocking means at said receiving register operated responsive to the receipt of said coded signals for preventing further signals from reaching said code checking means, intercept circuit means for maintaining said originally received coded signals at the input of said code checking means, evaluation means operated responsive to the signals from said code checking means for evaluating and storing said checked coded signals and for releasing said intercept circuit means and said blocking means, said evaluation occurring while said confirmation signal is being transmitted, means at said sending register operated responsive to said confirmation signal, for terminating transmission of said coded signals, and means including said code checking means at said receiving register operated responsive to the termination of transmission of said coded signals for terminating said confirmation signal.

2. The arrangement of claim 1 wherein said evaluation means comprises evaluation elements for interpreting said coded signal, means responsive to said operated evaluation element for releasing said intercepting circuit means, and storage means for registering said intercepted signal.

3. The arrangement of claim 2 wherein said evaluation means further comprises register advance circuit chain means for selecting available storage means and means responsive to said selection of available storage means for releasing said blocking means.

4. The arrangement of claim 3 including programming means for controlling the receiving register sender means simultaneously with said receiving register code checking means.

5. The arrangement of claim 2 wherein confirmation code checking means are provided at said transmitting register means, blocking means between said transmitting register receiver means and said transmitting register confirmation signal checking means to prevent further signals from reaching said signal checking means, transmitting register intercept circuit means for maintaining said received confirmation signal at said checking means input, means for evaluating said confirmation signal and means for releasing said intercept circuit means responsive to said evaluation.

6. The arrangement of claim 5 wherein said means for evaluating said confirmation signal comprises confirmation signal evaluation element for interpreting said confirmation signal, buffer storage means for registering said intercepted confirmation signal and means for releasing said blocking means responsive to the said registered signal in said buffer storage means.

References Cited by the Examiner

UNITED STATES PATENTS

| | | | |
|---|---|---|---|
| 2,897,283 | 7/1959 | Pearce et al. | 179—18 |
| 3,198,886 | 8/1965 | Baumbach | 179—18 |

KATHLEEN H. CLAFFY, *Primary Examiner*.

H. ZELLER, *Assistant Examiner*.